United States Patent [19]

Bell

[11] Patent Number: 5,009,568
[45] Date of Patent: Apr. 23, 1991

[54] WAVE ACTUATED POWER GENERATING APPARATUS

[76] Inventor: George S. Bell, 1365 Kingswood Ct., Ft. Myers, Fla. 33919

[21] Appl. No.: 551,144

[22] Filed: Jul. 11, 1990

[51] Int. Cl.$^5$ .................................. F03B 13/12
[52] U.S. Cl. .................... 415/3.1; 415/182.1; 290/53
[58] Field of Search ............. 415/2.1, 3.1, 905, 906, 415/182.1; 290/42, 53

[56] References Cited

U.S. PATENT DOCUMENTS

| 6,132 | 2/1849 | Secor | 415/3.1 |
| 4,023,915 | 5/1977 | Kerby | 415/906 |

FOREIGN PATENT DOCUMENTS

| 444270 | 12/1912 | France | 415/2.1 |
| 985402 | 12/1982 | U.S.S.R. | 415/2.1 |

*Primary Examiner*—John T. Kwon
*Attorney, Agent, or Firm*—Charles J. Prescott

[57] ABSTRACT

A wave-actuated power generating apparatus comprising an impulse-type water turbine mounted for rotation on an upright output shaft within a housing. The housing includes a back panel and opposing sides and upper and lower surfaces which form an inlet water nozzle. The water nozzle is oriented to face oncoming waves and to direct them into the housing. A wave splitter directs a portion of each oncoming wave directly against the facing surfaces of the water turbine blades, while another wave portion is directed first against the back panel of the housing and, thereafter, against the facing surfaces of the blades. Each wave portion is redirected arcuately forwardly through about 180 degrees inwardly toward the central portion of the housing causing the water turbine to rotate. Thereafter, the water within each wave entering the housing is discharged downwardly through a water outlet positioned in the housing lower surface behind the wave splitter. By this arrangement of wave splitting, a more uniform and extended wave pulse per wave for rotating the water turbine to produce power is effected.

8 Claims, 5 Drawing Sheets

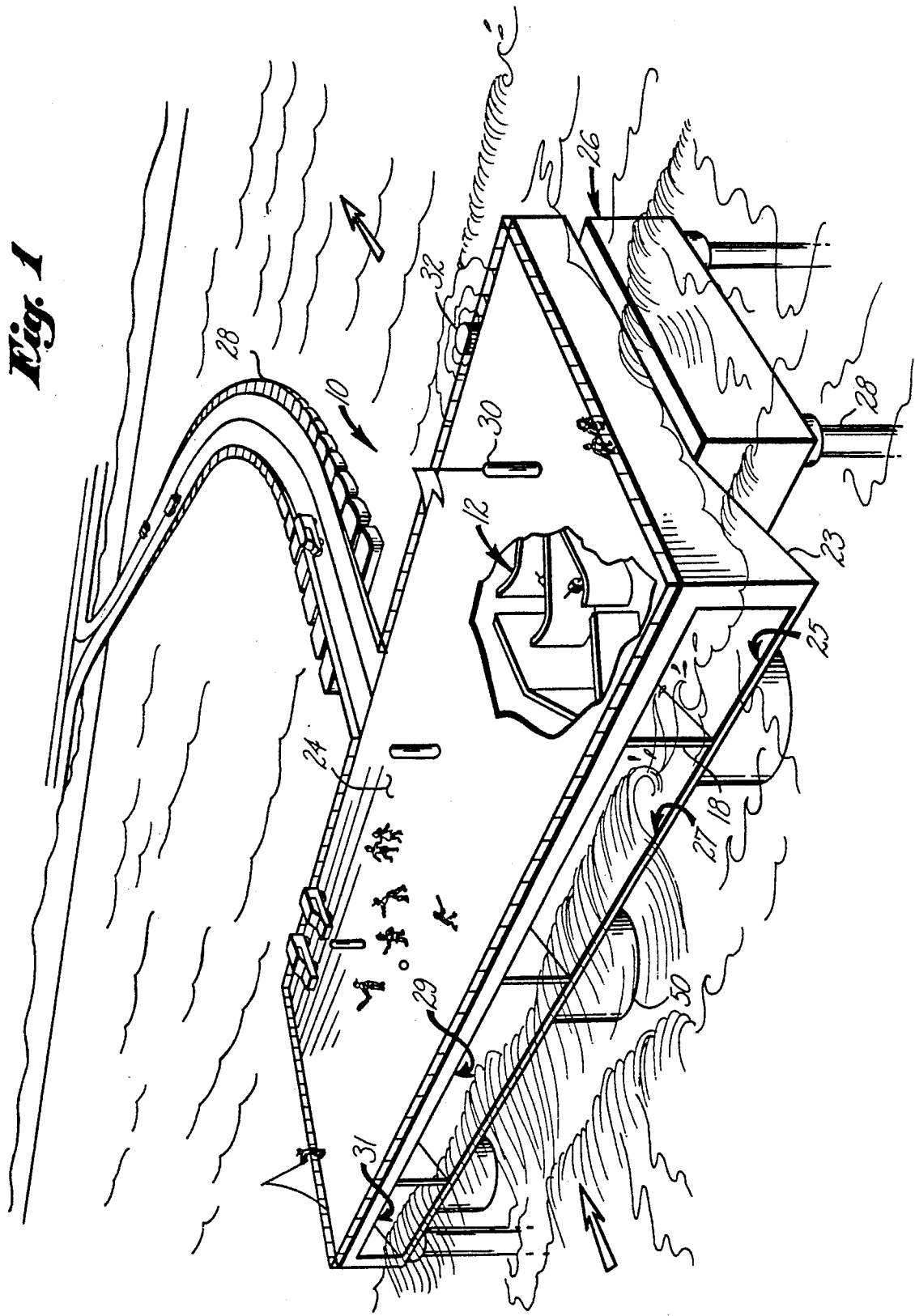

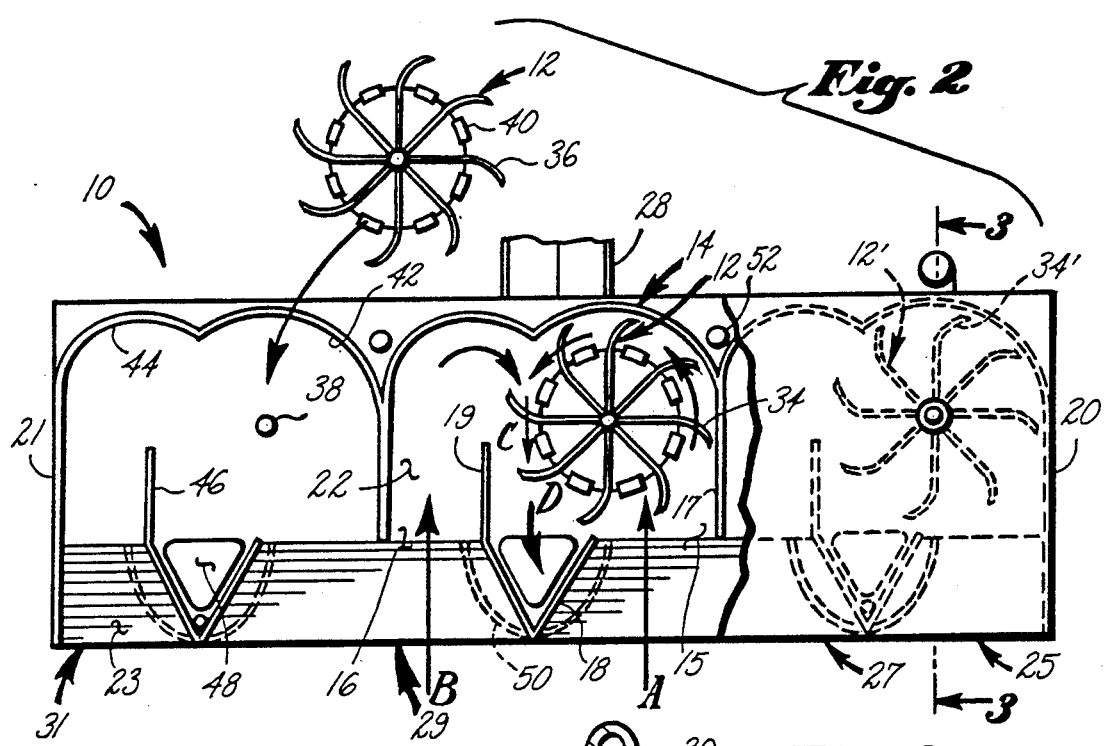
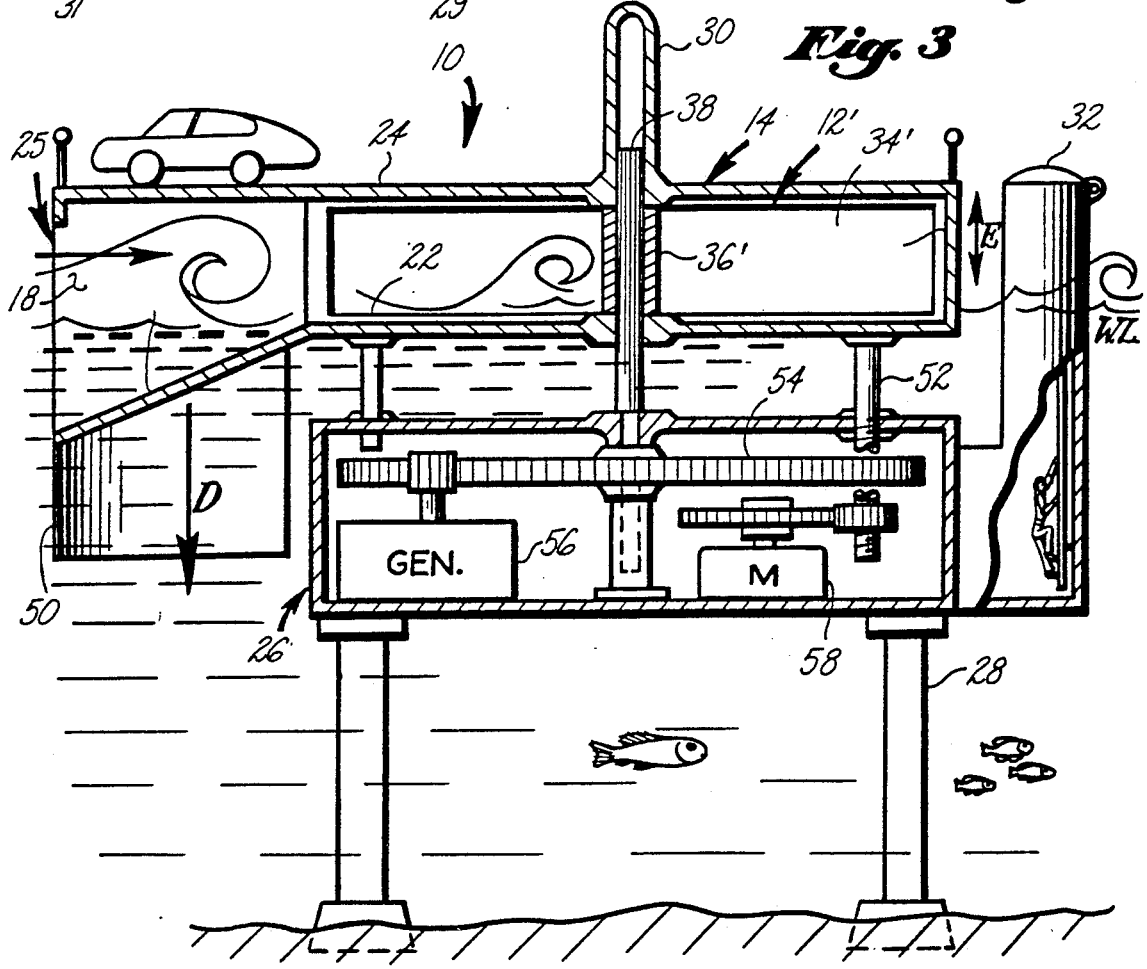

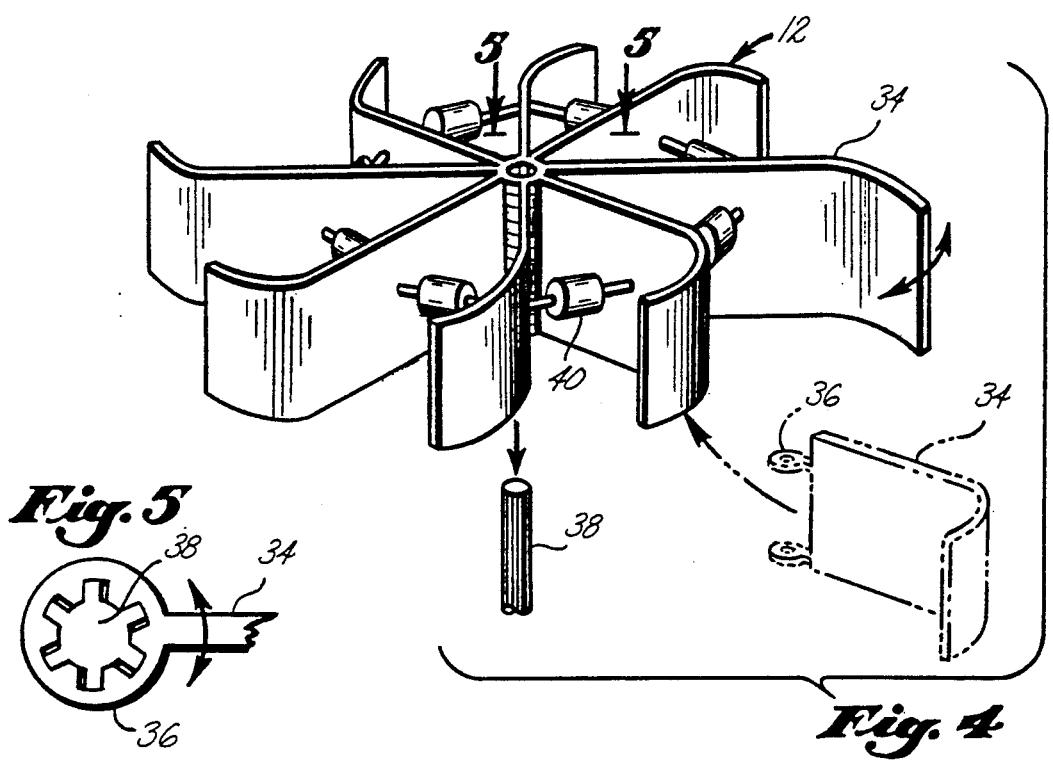
Fig. 5
Fig. 4
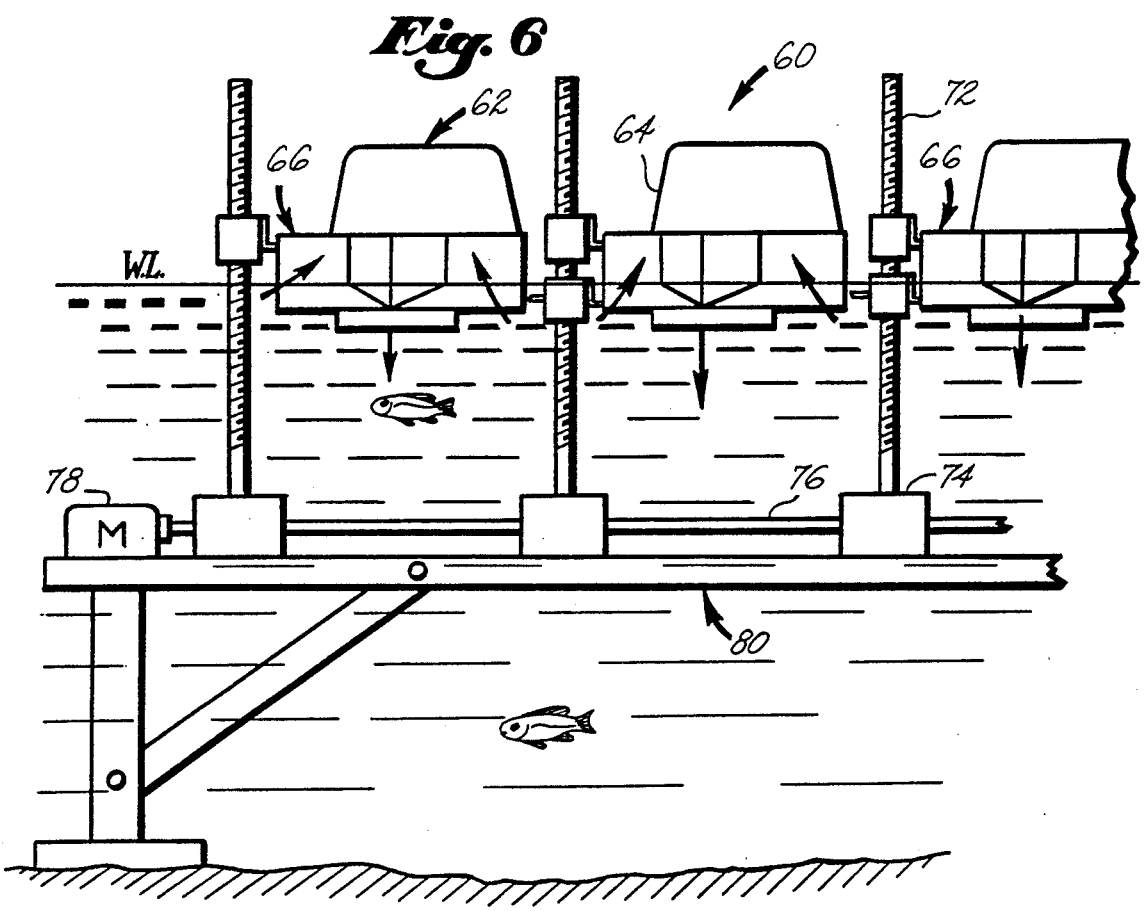
Fig. 6

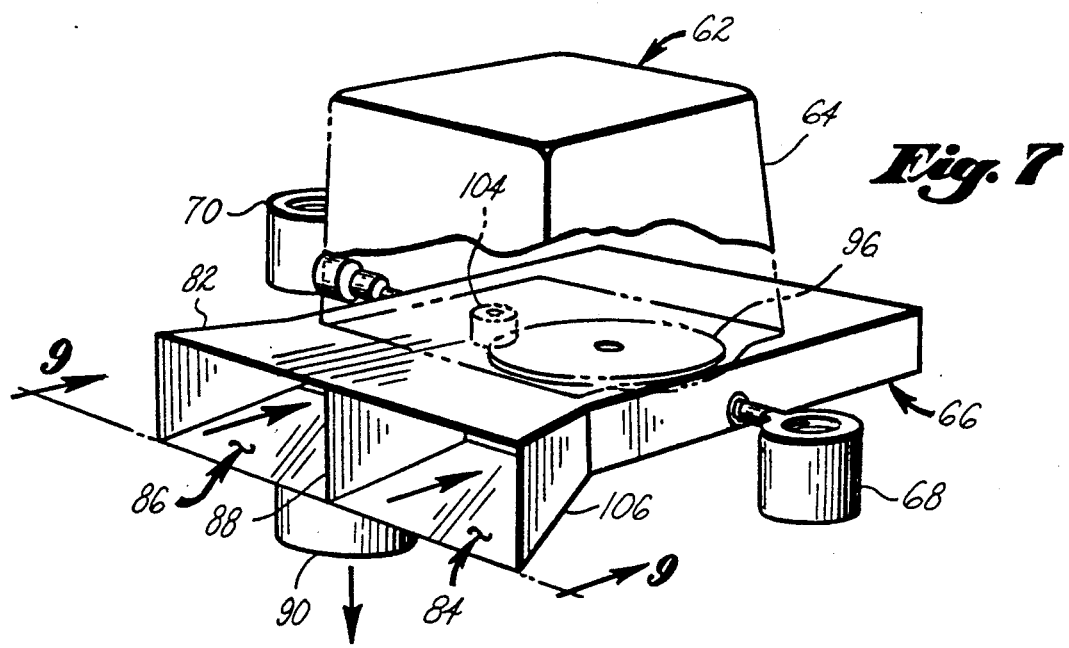
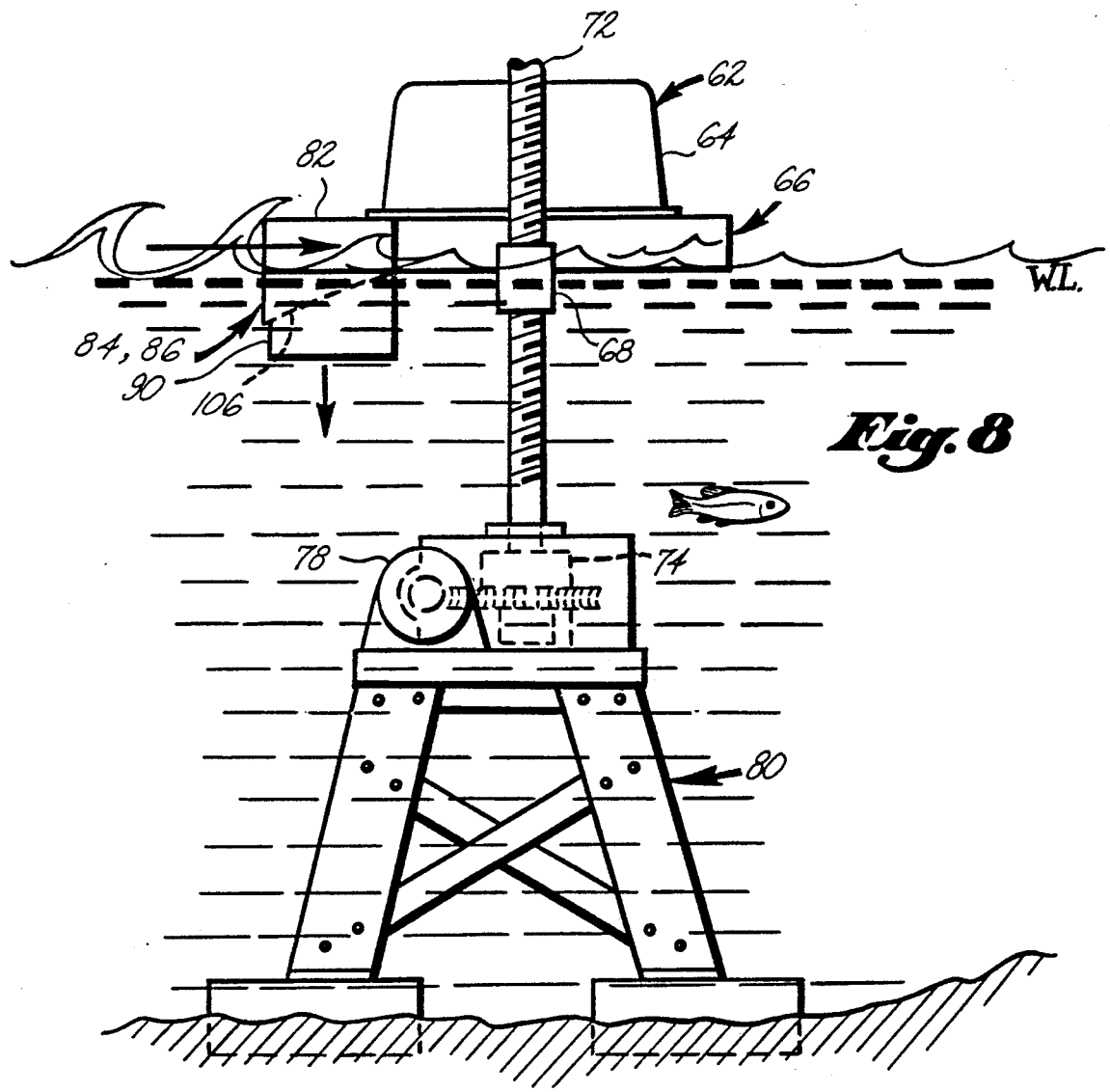

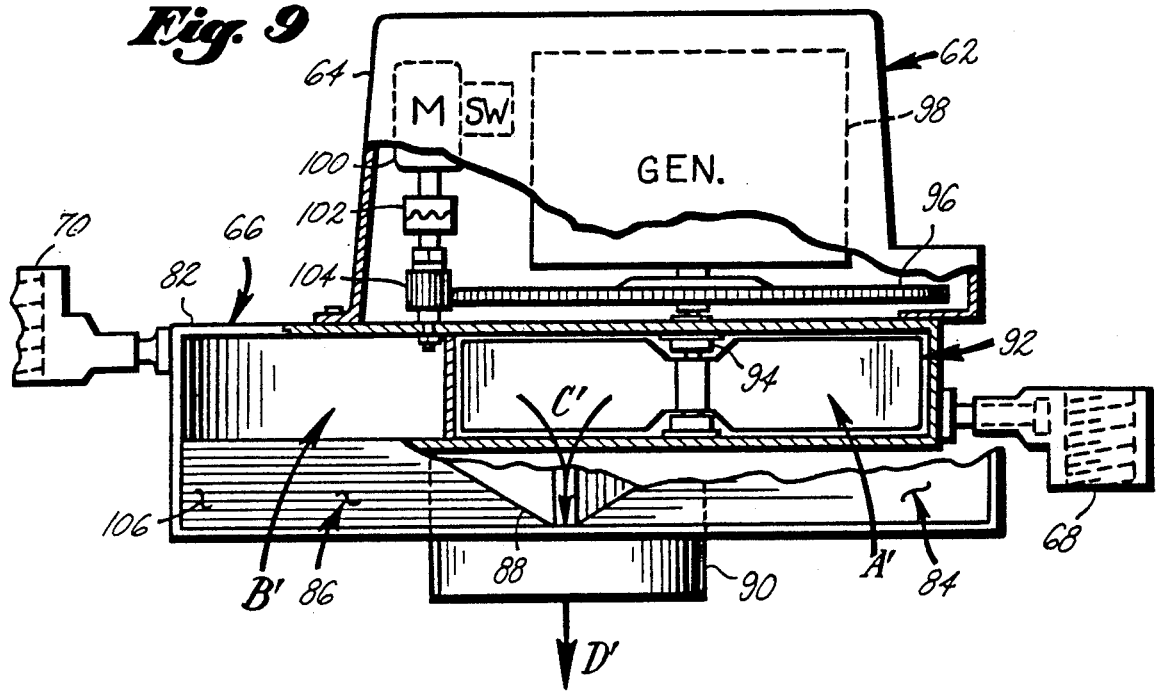
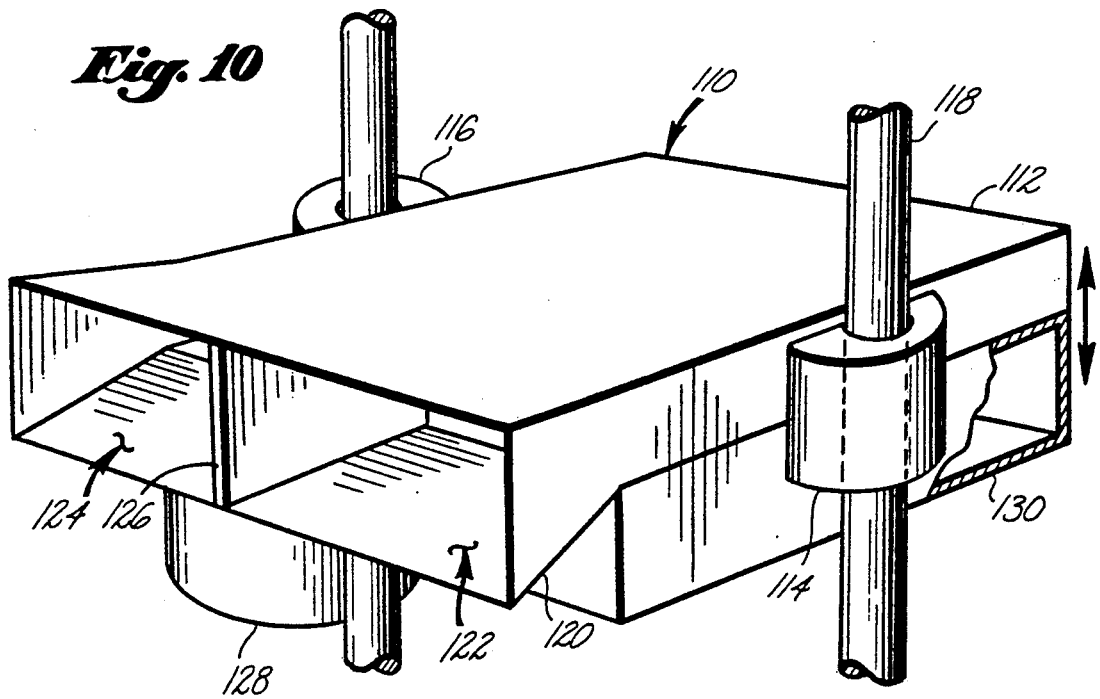

WAVE ACTUATED POWER GENERATING APPARATUS

BACKGROUND OF THE INVENTION

This invention relates generally to a power generating apparatus, and more particularly to a wave actuated power generating apparatus utilizing an impulse-type water turbine.

Considerable effort has been expended to harness the immense power of nature. To that end, the following U.S. Patents have been created to harness the energy contained in a large body of water, and particularly the surface waves generated by wind occurring thereupon:

| | |
|---|---|
| 3,220,255 | Yoshio Masuda |
| 3,204,110 | Yoshio Masuda |
| 3,231,749 | E. C. Hinck III |
| 3,487,228 | B. Kriegel |
| 3,515,889 | A. W. Kammerer |
| 3,930,168 | Tornabene |
| 3,961,863 | Hooper, III |
| 4,164,383 | French |
| 4,204,406 | Hopfe |
| 4,258,269 | Tsubota |
| 4,284,902 | Borgren, et al. |
| 4,341,959 | Ambli |
| 4,441,030 | Bellamy |
| 4,454,429 | Buonome |
| 4,622,473 | Curry |

However, none of these references disclose the unique structural and operating features of the present invention which utilizes an impulse-type water turbine generally horizontally mounted for rotation within a housing having an inlet nozzle to receive and split each oncoming wave. One portion of the divided wave serves to directly impact upon the facing surfaces of the water turbine blades causing rotation thereof, while the other portion of the divided wave is redirected from the back panel of the housing to then act against the facing blade surfaces so as to cause a delayed impulse for rotating the water turbine for each wave. The result is a more continuous utilization of the energy contained in each wave to rotate the water turbine.

BRIEF SUMMARY OF THE INVENTION

This invention is directed to a wave-actuated power generating apparatus comprising an impulse-type water turbine mounted for rotation on an upright output shaft within a housing. The housing includes a back panel and opposing sides and upper and lower surfaces which form an inlet water nozzle. The water nozzle is oriented to face oncoming waves and to direct them into the housing. A wave splitter directs a portion of each oncoming wave directly against the facing surfaces of the water turbine blades, while another wave portion is directed first against the back panel of the housing and, thereafter, against the facing blade surfaces of the water turbine blades. Each wave portion is redirected arcuately forward through about 180 degrees inwardly toward the central portion of the housing causing the water turbine to rotate. Thereafter, the water within each wave entering the housing is discharged downwardly through a water outlet positioned in the housing lower surface behind the wave splitter. By this arrangement of wave splitting, a more uniform and extended wave pulse per wave for rotating the water turbine to produce power is effected.

It is therefore an object of this invention to provide a wave actuated power generating apparatus having an impulse-type water turbine which harnesses oncoming waves for producing power.

It is another object of this invention to provide a wave actuated power generating apparatus having an impulse-type water turbine which more efficiently utilizes oncoming waves by producing a more continuous turning momentum for the water turbine through splitting of each oncoming wave and redirecting of a delayed portion of that split wave against the blades of the water turbine blades.

It is yet another object of the above invention to provide automatic vertical positioning of the apparatus to accommodate tide shifts.

It is yet another object of the above invention to provide dampening means between each hinged water turbine blade on a hub for providing more uniform rotational driving force of the water turbine.

In accordance with these and other objects which will become apparent hereinafter, the instant invention will now be described with reference to the accompanying drawings.

BRIEF DESCRIPTION OF THE DRAWINGS

FIG. 1 is a perspective view of an offshore power plant embodying the present invention.

FIG. 2 is a top plan, partially broken view of FIG. 1 showing one of the water turbines removed therefrom.

FIG. 3 is a section view in the direction of arrows 3—3 in FIG. 2 depicting a solid hub and rigid blade embodiment of the water turbine.

FIG. 4 is a perspective view of the preferred embodiment of the water turbine shown in FIG. 1.

FIG. 5 is an enlarged view in the direction of arrows 5—5 in FIG. 4.

FIG. 6 is a side elevation view of another embodiment of the invention.

FIG. 7 is a perspective view of one of the water turbine power generating units shown in FIG. 6.

FIG. 8 is an end elevation view of FIG. 6.

FIG. 9 is a partially broken view in the direction of arrows 9—9 in FIG. 7.

FIG. 10 is a perspective view of an alternate embodiment of the housing of the invention as shown in FIG. 6, including a floatation chamber for automatic vertical repositioning of the housing with shifting tides.

DETAILED DESCRIPTION OF THE INVENTION

Referring now to the drawings, and particularly to FIGS. 1 to 5, the preferred embodiment of the invention is shown generally at numeral 10 and is in the form of a self-contained power generating facility such as for a portion of a municipality and having a trio of large impulsetype water turbines 12 disposed within an equal number of housings shown typically at 14. Each water turbine 12 is mounted on an upright output shaft 38 which, in turn, is mounted for rotation and vertical translation within bearings in the lower and upper panels 22 and 24, respectively as best seen in FIG. 3.

Each water turbine 12 as best seen in FIG. 4 includes a plurality of shaped turbine blades 34 having a concaved leading surface for enhanced efficiency. Each blade 34 includes a pair of mounting ears 36 which collectively slidably engage onto the splined upper end of output shaft 38 to form the hub of the turbine blade 12. As depicted in FIG. 5, then, each turbine blade 34 is free to rotate back and forth a small angular distance shown in the direction of the arrow about output shaft 38 because the mating notches within ears 36 are slightly larger than the lands of the spline of the output shaft 38. This rotational displacement function of the blades 34, in conjunction with displacement dampers 40 connected between each adjacent blade 34, will be explained herebelow.

Each housing 14, having a water turbine 12 mounted for counterclockwise rotation therein as viewed in FIG. 2, includes the lower panel 22 and the upper panel 24, along with opposing side panels shown typically at 17 and at end panels 21 and 29. These opposing lower and upper panels and opposing side panels of housing 14 serve to form inlet nozzles 25, 27, 29, and 31 which are oriented to face oncoming cresting waves as best seen in FIG. 1 and 3. In the preferred embodiment, each of these water inlet nozzles 25, 27, 29, and 31 includes a scoop panel 23 which downwardly slopes from the lower panel 22 so as to form an enlarged wave collecting nozzle opening. Typically the lower panel 22 is positioned at or slightly above the mean water level WL so that the upper portion of cresting waves lies above mean water level WL. Thus, scoop panel 23 serves to gather the submerged portion of each cresting wave into each housing 14.

A wave splitter 18 formed of upright angularly spaced walls is connected centrally within the forwardly facing opening of each housing 14 between the upper and lower panels 24 and 22 as best seen in FIG. 2. This wave splitter 18 thus forms a first and second inlet nozzle portion shown typically at 15 and 16 for each housing 14. Each wave which strikes against scoop 23 also is divided by each wave splitter 18 so that a first wave portion enters into housing 14 through water nozzle portion 15 in the direction of arrow A while a second wave portion enters through water nozzle portion 16 in the direction of arrow B.

The wave portion entering housing 14 in the direction of arrow A directly strikes the facing surfaces of each blade 34 causing the water turbine 12 to rotate counterclockwise in the direction of the arrows. The distal tips of each blade 34 lie in close proximity to the arcuate back panel portion 42 whereby wave energy is imparted over an arc of revolution of in excess of ninety degrees so as to increase the efficiency of each wave in rotating water turbine 12. The first wave portion entering in the direction of arrow A thus is arcuately deflected around back panel portion 42 through an arc of more than ninety degrees but slightly less than one hundred eighty degrees toward the central portion of the housing 14 as best seen in FIG. 2.

The second wave portion of each wave divided by water splitter 18 enters into housing 12 in the direction of arrow B and directly strikes the arcuate back panel portion 44. This second wave portion is then redirected through more than ninety degrees and toward the center of housing 14 as shown. At this point the second wave portion meets the first wave portion coming off of arcuate back panel portion 42 so as to merge and cause the first and second wave portion to be more fully redirected forwardly in the direction of arrow C. It is here that the second wave portion contributes an additional rotational impulse against the forwardly facing surfaces of each blade 34. The merged wave portions then ebb forwardly in the direction of arrow C to continue to rotate the water turbine 12.

Also formed into the scoop 23 are a plurality of water outlets shown typically at 48. Each water outlet 48 is an aperture formed into scoop 23 within and behind each water splitter 18 as best seen in FIG. 2. Thus, each wave portion merging and forwardly flowing at arrow C then discharges downwardly in the direction of arrow D in FIG. 2 and 3 to return to the sea.

Thus, by this arrangement, each wave which strikes scoop 23 is split into two components by water splitter 18 and enters water housing in the direction of arrows A and B. The wave portion entering in the direction of arrow A strikes the facing surfaces of the blades 34 of water turbine 12 directly before the wave portion entering in the direction of arrow B which must first impact against arcuate back panel portion 44 and be redirected forwardly to then contact blades 34. Therefore each wave produces a broader pulse on the blades 34 of water turbine 12 so as to provide a more uniform rotational force input thereupon for use. If the lower panel 22 is slightly elevated above water level WL, the ebbing effect of the merged wave portions in the direction of arrow C toward outlet 48 will be greater.

Each output shaft 38 is operably connected by a weighted fly wheel 54 to a power generator 56 within a second water tight housing shown generally at numeral 26. Because the present invention is intended for use in ocean settings wherein tide fluctuations will vary the mean water level WL, a separate motor 58 is provided which automatically by remote sensor (not shown) actuates lift rods 52 which are connected to the lower panel 22 as best seen in FIG. 3. Thus, lift motor 58 moves the entire water turbine 12 and housing 14 arrangement up and down in the direction of arrow E in FIG. 3 so as to maintain the lower surface 22 at approximately the mean water level WL. The splined end of each output shaft 38 is concealed within shaft cap 30 so as to avoid exposure and contact with the environment and individuals. Although the entire housing 14 arrangement including the recreational top surface of upper panel 24 is shown movable, the recreational deck surface may be made stationary with the housing 14 and water turbine 12 with lower panel 22 and scoop 23 only made vertically movable for tide shifts.

The water tight lower housing 26 is provided with an access conduit 32 having an entrance above water as shown in FIGS. 1 and 3. Additionally, the upper surface 24 may typically be used as a recreational area connected to shore by a causeway 28 because of the relatively immense intended proportions of this embodiment 10 of the invention.

To enhance the efficiency of the present invention, the apparatus 10 is typically placed from shore so that the inlet nozzles 25, 27, 29 and 31 are in the vicinity of cresting waves as best seen in FIG. 1. To help insure that cresting waves do not enter into each housing 14 through outlets 48, an arcuate barrier 50 is also provided connected and downwardly extending from the scoop 23 as best seen in FIGS. 1 and 3. Thus, sea water exiting the housing 14 through outlets 48 in the direction of arrow D is shielded from oncoming waves by barrier 50.

As may be now appreciated with respect to FIGS. 4 and 5, the fluid displacement dampers 40 connected between each adjacent turbine blade 34 are provided in the preferred embodiment 12 of the water turbine so as to absorb the wave impulse from each cresting wave entering into each housing 14. These dampers 40 are spring biased in a neutral position and are structured so as to allow each blade 34 to move with respect to the adjacent blades as the force of each wave impacts thereagainst. In this manner, these dampers 40 also serve to apply more uniform rotational input to the output shaft 38 as the internal spring biasing returns each blade 34 to its neutral position after being successively impacted by each wave. These dampers 40 may also be operably connected so that fluid displaced is made to flow through external conduits to drive a separate motor for additional power generation.

Although the preferred embodiment of the water turbine is shown and described at numeral 12, an alternate embodiment is shown at numeral 12' in FIGS. 2 and 3 includes a solid hub 36' and fixed turbine blades 34'. Although it is the empirical judgment of applicant that the displacement dampers 40 in conjunction with hinge connected blades 34 as previously described are preferred, nonetheless a fixed hub turbine blade 12' will also function acceptably.

Referring now to FIGS. 6 to 9, another smaller-scale embodiment of the invention is shown generally at numeral 60 in the form of a more compact and easier to deploy power generating apparatus. This system 60 includes a plurality of individual power generating devices shown generally at 62 each of which include a lower housing 66 atop which is sealably mounted an upper housing 64. Upper housing 64 includes, as best seen in FIG. 9, a power generator 98 operably connected to a fly wheel 96 which is driven by output shaft 94.

Contained within each lower housing 66 is a fixed blade water turbine 92 mounted for rotation about the upright output shaft 94 as previously. Each lower housing 66 includes inlet nozzles 84 and 86 having a sloping scoop 106 for enhanced wave collection as previously described. Wave splitter 88 serves to divide each oncoming wave so that a first portion enters water nozzle 84 in the direction of arrow A', while a second wave portion enters water nozzle 86 in the direction of arrow B', both acting upon water turbine 92 as previously described in merging centrally at C' to thereafter downwardly discharge through water outlet 88 in the direction of arrow D'. Barrier 90 is provided so as to shield water exiting the lower housing 66 through water outlet 88 from oncoming waves, again as previously described.

Also provided in this embodiment 62 is a small starter motor 100 connected to the peripheral teeth of fly wheel 96 by gear 104 through clutch 102. Thus, should an initial rotational momentum be required upon water turbine 92, this starting arrangement provides that initial rotational momentum.

Each power generating device 62 includes outwardly extending flanges 68 and 70 which are internally threaded to mate over support shafts 72. These support shafts 72 are mounted for driven rotation within gear boxes 74 which, in turn, are rotationally driven by drive shafts 76 by lift motor 78. This entire lifting arrangement is mounted on frame 80 which rests atop the bottom of the sea at a position off shore so that water nozzles 84 and 86 are facing oncoming cresting waves.

Referring lastly to FIG. 10, a variation of the housing as described in FIGS. 6 to 9 is shown generally at numeral 110. This housing 110 includes an upper portion 112 which houses the water turbine (not shown) and wave directing structure as previously described in other embodiments. This upper housing portion 112 also includes first and second inlet nozzles 122 and 124, respectively separated by water splitter 126 as previously described. The bottom surface of the water nozzles 122 and 124 includes a downwardly sloping scoop 120 for enhanced wave gathering into the upper housing 112. Again, curved barrier 128 is also provided for unobstructed discharge of sea water after having effected its rotational effect upon the water turbine.

This embodiment 110 also includes a lower ballast housing 130 which is air tight and is sized so that the entire housing 110 and the power generator 62, previously described in FIGS. 6 to 9 thereatop, is buoyant such that the scoop 120 is slightly submerged and that the lower panel of upper housing 112 is at or slightly above mean water level. Guides 114 and 116 slidably mounted on shafts 118 which extend downwardly to the sea bottom to allow the entire apparatus 110 and power generator (not shown) to rise and fall with the tide to maintain proper elevational relationship between oncoming cresting waves. This ballast housing 130 may also be controllably partially filled with sea water to slightly vary the elevation of scoop 120 with regard to the mean water level to enhance efficiency.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A wave-actuated power generating apparatus comprising:
    an impulse-type water turbine having a plurality of blades each with a facing and a following surface and operably mounted for rotation within a housing onto an upright output shaft about a hub for use;
    said housing having a back panel, opposing sides and opposing lower and upper panels, said lower and upper panels in close proximity to the upper and lower edges of said water turbine;
    said sides and lower and upper panels extending to form an inlet nozzle which faces oncoming waves;
    a wave splitter positioned centrally within said inlet nozzle forming a first and second inlet nozzle portion structured to separate each oncoming wave so that a first and second portion of each wave passes through said first and second inlet nozzle portions, respectively and into said housing;
    said first wave portion passing through said first water nozzle portion striking said facing surfaces of said water turbine blades before contacting said housing back panel while being reversed in direction through about 180 degrees toward the center of said housing;
    said second wave portion passing through said second water nozzle portion striking said housing back panel and being reversed in direction through about 180 degrees toward the center of said housing before striking said facing surfaces of said water turbine blades;
    a water outlet positioned centrally in said housing lower panel behind said wave splitter for downwardly discharging water entering said inlet nozzle after rotationally acting upon said water turbine;

said housing lower surface positioned generally at mean water level.

2. A water actuated power generating apparatus as set forth in claim 1, wherein each of said plurality of blades is hinge-connected to said hub, further comprising:

blade displacement damping means connected between each adjacent blade of said plurality of blades for reducing relative motion therebetween upon wave impact.

3. A water actuated power generating apparatus as set forth in claim 1, further comprising:

an outlet barrier formed around and downwardly extending from said water outlet structured to deflect oncoming waves away from water discharging from said water outlet.

4. A water actuated power generating apparatus as set forth in claim 3, further comprising:

an inlet scoop forwardly and downwardly extending from said housing lower panel for increasing collection of oncoming waves into said housing.

5. A water actuated power generating apparatus as set forth in claim 4, further comprising:

means for automatically maintaining said housing lower panel generally at mean water level with shifting tides.

6. A water actuated power generating apparatus as set forth in claim 4, further comprising:

means for controlledly maintaining said housing lower panel generally at a preselected level with respect to mean water level with shifting tides.

7. A water actuated power generating apparatus as set forth in claim 3, wherein:

said back panel is contoured having two adjacent concaved arcuate portions, one said arcuate portion curving in close proximity to the tips of said plurality of blades, both said arcuate portions uniformly redirecting said first and second wave portions from said water inlet nozzle to said water outlet while the wave portions act upon said plurality of blades to rotate said water turbine.

8. A water actuated power generating apparatus as set forth in claim 6, further comprising:

a weighted fly wheel connected to said outport shaft for reducing pulsations in water turbine speed.

* * * * *